United States Patent
Butz et al.

(10) Patent No.: US 9,695,897 B2
(45) Date of Patent: Jul. 4, 2017

(54) BRAKE DISC FOR A VEHICLE WITH A WEAR INDICATOR

(71) Applicant: MAN Truck & Bus AG, München (DE)

(72) Inventors: Matthias Butz, München (DE); Florian Orgler, München (DE)

(73) Assignee: MAN TRUCK & BUS AG, Munich (DE)

( * ) Notice: Subject to any disclaimer, the term of this patent is extended or adjusted under 35 U.S.C. 154(b) by 0 days.

(21) Appl. No.: 14/633,293

(22) Filed: Feb. 27, 2015

(65) Prior Publication Data

US 2015/0267768 A1 Sep. 24, 2015

(30) Foreign Application Priority Data

Mar. 19, 2014 (DE) .................. 10 2014 003 986

(51) Int. Cl.
| | |
|---|---|
| *F16D 66/02* | (2006.01) |
| *F16D 65/12* | (2006.01) |
| *F16D 65/02* | (2006.01) |
| *F16D 69/00* | (2006.01) |

(52) U.S. Cl.
CPC ............ *F16D 66/02* (2013.01); *F16D 65/12* (2013.01); *F16D 65/127* (2013.01); *F16D 2065/1328* (2013.01); *F16D 2069/004* (2013.01)

(58) Field of Classification Search
CPC ........ F16D 65/12; F16D 65/127; F16D 66/02; F16D 2069/004
USPC ..................................... 188/1.11 W, 218 XL
See application file for complete search history.

(56) References Cited

U.S. PATENT DOCUMENTS

| | | | | |
|---|---|---|---|---|
| 6,457,566 | B1 | 10/2002 | Toby | |
| 6,631,791 | B2 * | 10/2003 | Moore | F16D 65/12 |
| | | | | 188/1.11 W |
| 7,097,007 | B2 * | 8/2006 | Lin | F16D 65/0031 |
| | | | | 188/218 XL |
| 7,228,947 | B2 * | 6/2007 | Meroni | B22D 25/00 |
| | | | | 164/200 |
| D640,620 | S * | 6/2011 | Bielis, IV | D12/180 |
| 8,851,245 | B2 * | 10/2014 | Bielis, IV | F16D 65/127 |
| | | | | 188/218 XL |
| 2007/0181390 | A1 * | 8/2007 | Korm | F16D 65/128 |
| | | | | 188/218 XL |

(Continued)

FOREIGN PATENT DOCUMENTS

| | | |
|---|---|---|
| DE | 69300968 T2 | 5/1996 |
| DE | 10 2005 032 638 A1 | 1/2007 |

(Continued)

*Primary Examiner* — Thomas Irvin
(74) *Attorney, Agent, or Firm* — Lucas & Mercanti, LLP

(57) ABSTRACT

A brake disc for a vehicle has a wear indicator disposed in a braking surface of the brake disc and embodied such that its appearance in a top view of the braking surface changes across a reducing level of wear. The brake disc further has a reference indicator disposed in the braking surface of the brake disc and is embodied such that its appearance in a top view of the braking surface does not change across the reducing level of wear or changes differently in a specified manner relative to the change in the wear indicator so that wear progression can be discerned from the appearance of the wear indicator in relation to the appearance of the reference indicator.

7 Claims, 13 Drawing Sheets

(56) References Cited

U.S. PATENT DOCUMENTS

2011/0048876 A1* 3/2011 Bujak .................. F16D 65/12
 188/218 XL
2013/0299284 A1 11/2013 Lange

FOREIGN PATENT DOCUMENTS

DE 102010037382 A2 3/2012
EP 1 108 918 A2 6/2001

* cited by examiner

BRAKE DISC FOR A VEHICLE WITH A WEAR INDICATOR

CROSS REFERENCE TO RELATED APPLICATIONS

The present application claims priority of DE 10 2014 003 986.2, filed Mar. 19, 2014, which is incorporated herein by reference.

BACKGROUND OF THE INVENTION

The invention relates to a vehicle brake disc with a wear indicator.

As a result of high demands on safety-relevant components in vehicles, a brake disc thickness in a vehicle is measured at regular intervals so that the brake disc can be replaced in good time. An inadequate brake disc thickness increases the risk of heat cracks and the risk of severe wear of the brake linings up to failure of the brake disc. In order to avoid premature replacement of the brake disc and unnecessary time in the garage, it is furthermore necessary to be able to ascertain the remaining service life which is still available. In the case of commercial vehicles, this measuring process normally requires a pit or removal of the wheels which is time-consuming. It can also be very difficult for a lay person to carry this out himself or herself.

It is known from practice to normally use micrometer screws in order to measure the state of wear of the brake disc or the thickness of the brake disc. This is necessary since a ridge is often retained on the outer edge of the brake disc, which ridge does not allow the use of a gauge or a conventional sliding calliper.

It is furthermore known from the prior art to provide wear features, also referred to below as wear indicators, in the brake disc friction surface in the form of a recess, pocket, groove, bore or chamfer. In this case, different embodiment variants are known which may differ according to three aspects:

According to a first aspect, variants are known in which the wear features appear with increasing wear and can be seen to their full extent in the case of terminal wear, e.g., EP 1 108 918 B1. Variants are furthermore known in which the wear features disappear with increasing wear and can no longer be seen in the case of terminal wear, e.g., DE 10 2005 032 638 A1.

According to a second aspect, wear features are known which only mark the terminal state of wear, e.g., U.S. Pat. No. 6,457,566 B1, and wear features which enable a continuous reading off of the state of wear, e.g., US 2013/0299284 A1. The brake disc known from laid-open application US 2013/0299284 A1 has depressions with different diameters which are incorporated in the rear side of the friction ring. With increasing wear, these are covered and can then only be interpreted in terms of brake disc wear with the aid of a measuring gauge.

According to a third aspect, variants are known in which wear features are distributed over the circumference in order to ensure a better view or in the case of which several features are additionally provided which are distributed radially on the brake disc in order to be able to ascertain a radial or concave oblique wear, e.g., EP 1 108 918 B1.

The described wear features usually, however, only represent a "black and white" display, i.e., in the event of a complete disappearance of the wear gauge, it can assumed that a defined threshold value has been reached at the corresponding point of the brake disc. Interim states and the continuous progression of wear can, however, as described in US 2013/0299284 A1, only be ascertained with an additional measurement tool as a reference which furthermore requires direct access to the brake disc.

BRIEF SUMMARY OF THE INVENTION

It is thus an object of the invention to provide a brake disc with an improved wear indicator with which disadvantages of conventional techniques can be avoided. The object of the invention is in particular to provide wear features on brake discs which enable more reliable monitoring of the brake disc wear without having to rely on further aids and without having to remove wheels. Moreover, brake discs with such wear indicators should be produced at low cost.

The brake disc according to the invention has a visually apparent wear display, comprising a wear indicator which is inserted into a braking surface of the brake disc and is embodied such that its appearance in a top view of the braking surface changes across a reducing level of wear. A reducing level of wear is to be understood as the thickness of the braking surface, also referred to as a friction surface or friction ring, of the brake disc which reduces with increasing wear.

The brake disc or the visually apparent wear display furthermore comprises a reference indicator which is inserted into the braking surface of the brake disc and is embodied such that its appearance in a top view of the braking surface does not change across the reducing level of wear or changes differently in a specified manner relative to the change in the wear indicator so that wear progression, in particular continuous wear progression, can be read off from the appearance of the wear indicator in relation to the appearance of the reference indicator.

A particular advantage of the invention lies in the fact that the progression of the wear can be determined on the basis of the relative appearance of the wear indicator and of the reference indicator, which appearance is visible in a top view of the braking surface, without further aids, such as slide gauges, i.e. can be read off visually and without the aid of further measurement devices or the like.

In one embodiment, the wear indicator and the reference indicator are embodied such that a position which is visible in a top view of the braking surface, shape, and/or dimension of the wear indicator change relative to a visible position, shape, and/or dimension of the reference indicator across the reducing level of wear in a specified manner.

According to general perspectives of the invention, the wear indicator is embodied such that, with the reducing feature of the wear, at least one further gauge of the wear indicator in the top view changes and leads to a change in the feature appearance. For example, the wear indicator can be selected such that, for example, a width, a length, a radius and/or an arc length of the wear indicator changes across the reducing level of wear.

Geometrically, this further gauge thus represents a non-constant function of the level of the wear indicator. These can be shapes such as, e.g., ramps or funnels, the width or length of which changes across the level of wear. Alternatively, a conical recess can be selected in which the radius changes across the level. Another example is helix shapes in which the arc length changes across the level of wear. The derivation of this function and thus the gradient of the changing parameter can be, e.g., linear or parabolic.

An appearance of the wear indicator in a top view of the braking surface is thus not restricted to a specific shape. The shape in a top view can be e.g. straight or arcuate.

As mentioned above, it is possible in the context of the invention to embody the reference indicator such that its appearance in a top view of the braking surface does not change across the reducing level of wear, for example, by incorporating a depression in the braking surface with a constant cross-section in the direction of wear. Alternatively, the reference indicator is embodied such that its appearance in a top view of the braking surface changes differently in a specified manner across the reducing level of wear relative to the change in the wear indicator, i.e., the appearance of the reference indicator changes to a different extent than the wear indicator itself.

In this case, the gauge of a non-constant function of the level of the reference indicator is selected such that the respectively visible position, shape and/or dimension of the reference indicator indicates a proportional reference point or notional zero position, relative to which the visible position, shape and/or dimension of the wear indicator can be compared in order to read off the relative wear progression.

According to a further aspect, a shape and an orientation of the reference indicator can be embodied such that it corresponds to a shape and orientation of the wear indicator in a top view of the braking surface. In contrast, the length of the wear indicator changes at least in one direction along the braking surface with increasing wear. Moreover, according to this variant, the reference indicator can be arranged adjacent to or in the direct vicinity of the wear indicator. According to this variant, the reference indicator can be formed such that an appearance in a top view of the braking surface is unchanged across a reducing level of wear.

According to this aspect, the appearance of the wear indicator and reference indicator, in the new state of the brake disc, can be substantially the same, wherein, with increasing wear, only the appearance of the wear indicator changes gradually so that, in each state of wear, a gauge which is visually easy to detect for the progression of the wear process is provided by comparison of the current appearance of the wear indicator with the appearance of the reference indicator.

According to a further embodiment, the reference indicator can be formed in the shape of an elevation, recess or edge which remains visible across the reducing level of wear. Moreover, the reference indicator according to this variant is arranged at a point of the braking surface at which the reference indicator, in the new state of the brake disc, is located adjacent to or in the direct vicinity of a region, e.g., an end region, of the wear indicator, wherein the region changes its position with a reducing level of wear, i.e., this region defines a visibly migrating wear mark on the braking surface. The respective distance between the migrating end region of the wear indicator and the stationary elevation, recess or edge of the reference indicator thus represents a gauge for the wear progression which is visually easy to detect.

The reference indicator thus describes by means of its shape and position the starting position of the wear mark which migrates as a result of wear.

It is particularly advantageous if such an elevation, recess or edge is provided at both end regions of the wear indicator.

The wear indicator can be formed as a ramp-shaped recess, and the reference indicator can be formed as a groove-shaped recess which runs parallel and adjacent to the ramp-shaped recess. Such a recess is also referred to below as a depression. A depth of the groove-shaped recess in the direction of wear is preferably at least as large as the maximum depth of the groove-shaped recess. This ensures that the reference indicator is also not visible in the maximum state of wear of the wear indicator. According to a further aspect of this embodiment variant, the ramp-shaped recess and the groove-shaped recess, in the new state of the brake disc, begin at an identical starting point and end at an identical end point. A parallel profile of the ramp-shaped and the groove-shaped recess refers, in the case of a curved profile of the recess, to a profile with an identical curvature, e.g., in the case of a circular arc-shaped profile of the ramp-shaped recess, the groove-shaped recess is arranged concentrically thereto. The groove-shaped recess can be embodied in particular with a constant depth.

According to an alternative embodiment variant, the wear indicator is formed as a ramp-shaped recess, the reference indicator is formed as a recess which is arranged at an angle between 0° and 180°, e.g., at right angles, and adjacent to the ramp-shaped recess, and the ramp-shaped recess and the recess begin, in the new state of the brake disc, at an identical starting point. For example, the reference feature can thus be arranged T- or L-shaped in relation to the wear feature. According to this embodiment variant, a depth of the recess in the direction of wear can preferably be in turn at least as large as the maximum depth of the ramp-shaped recess, which is, however, not essential.

According to a further exemplary embodiment, the wear indicator can be embodied as a funnel-shaped recess, and the reference indicator can be embodied by two depressions, for example, in the form of bores. In this case, a depth of the depressions is preferably at least as large as the maximum depth of the funnel-shaped recess. This in turn ensures that the reference indicator is also still visible in the maximum state of wear of the wear indicator.

Moreover, the elongated hole-shaped depressions, in the new state of the brake disc, are arranged adjacent to or in the direct vicinity of the opposite edge regions of the funnel-shaped recesses. A funnel-shaped recess within the meaning of this invention also refers in particular to a slot-shaped opening on the braking surface which tapers in a funnel shape in the direction of wear. The elongated hole-shaped depressions thus mark the original dimension of the wear indicator in the new state such that the distance which becomes larger with increasing wear from the edge region of the funnel-shaped recess to the elongated hole-shaped depression represents a gauge for wear.

In particular, the brake disc can be configured such that, if the funnel-shaped depression arranged between the elongated hole-shaped depressions is now barely visible or no longer visible, a maximum state of wear is reached which indicates to the driver or another person that the brake disc should be replaced.

According to a further embodiment variant, the wear indicator can be embodied as a helical recess, wherein an arc length of the helical recess on the braking surface reduces with a reducing level of wear. The formation of the wear indicator as a helical recess has the advantage that the wear-induced change in the wear indicator enables self-referencing. The original arc length in the new state can be derived, for example, from the current arc length so that the reference indicator can be formed as part of the wear indicator.

As a result, a feature of the helical recess, which is a gauge for original arc length in the new state, can be used as the reference indicator. An example of this is a radial edge of the helical recess, the position of which is unchanged with a reducing level of wear. Alternatively, the original arc length in the new state (or the arc length projected onto the braking surface in the new state) itself can also be used as the reference indicator if the arc length in the new state is fixedly defined since this can be derived from the current (remaining) arc length.

Alternatively, the original central angle of the circular arc which is generated by projecting the arc length onto the braking surface can be used. The central angle simultaneously reduces with an arc length of the helical recess which reduces as a result of wear.

According to a further embodiment, the wear indicator can be embodied as an elevation countersunk in the braking surface, which elevation tapers conically towards the braking surface, and the reference indicator can be an edge of the braking surface concentrically surrounding the countersunk elevation.

According to this embodiment variant, with a reducing level of wear, the countersunk elevation is gradually removed and shaped into a truncated cone with a reducing level which appears in a top view of the braking surface in the form of a widening circle. The distance from the upper circumferential edge of the truncated cone to the reference indicator reduces gradually and as a result visualizes the state of wear.

The brake disc and the countersunk elevation can, for example, be configured such that a maximum state of wear is characterized by a complete approximation of the truncated cone to the edge which concentrically surrounds the countersunk elevation (reference indicator). This embodiment variant thus also enables detecting a new state of the brake disc, a maximum state of wear and also the percentage progression of the wear visually and without further measurement means in a simple manner.

According to a further aspect of the invention, a plurality of wear indicators with one or more assigned reference indicators can be arranged distributed evenly on the brake disc. This has the advantage that the wear indicator can be better seen through the hand holes of the rim irrespective of the wheel position.

According to a further aspect, the appearance of the reference indicator in a top view of the brake disc can change linearly across a reducing level of wear. This is particularly advantageous for reading off the wear since a linear change, i.e., a constant increase or change in shape of the wear indicator, can be easily interpreted or extrapolated.

A further aspect of the invention relates to a vehicle, in particular a commercial vehicle, with a brake disc according to one of the aspects described above.

BRIEF DESCRIPTION OF THE DRAWINGS

Further details and advantages of the invention are described below with reference to the enclosed drawings. In these drawings.

DETAILED DESCRIPTION OF THE PREFERRED EMBODIMENTS

Figure 1A:
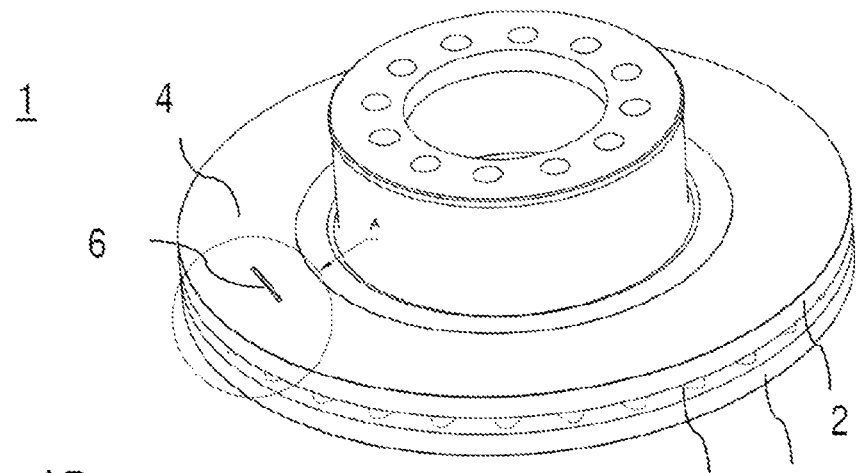
FIGS. 1A to 1C are a perspective view, a partial cross sectional view, and a magnified view of a brake disc according to a first exemplary embodiment in a first state of wear.

FIG. 1A shows a perspective view of an internally ventilated brake disc 1 with two brake discs 2, 3 which are arranged parallel across webs but spaced apart from one another. Air cooling of brake disc 1 is carried out via gap 5.

A visually apparent wear display 6 is provided on at least one braking surface or friction surface 4. Region A in FIG. 1A is represented in an enlarged form in the sectional view of FIG. 1B and the perspective view of FIG. 1C.

Wear display 6 is formed from a wear indicator in the form of a funnel-shaped recess 8 and a reference indicator, comprising two elongated hole-shaped depressions 7A and 7B. The depth of elongated hole-shaped depressions 7A and 7B is at least as large as the maximum depth of funnel-shaped depression 8 so that reference indicators 7A and 7B are also still visible in a state of maximum wear.

In a top view, funnel-shaped depression 8 appears as a slot-shaped depression. It is, however, apparent in the cross-sectional view of FIG. 2B that the depth of the depression increases towards the middle, i.e., is formed in a funnel shape.

Figure 1B:
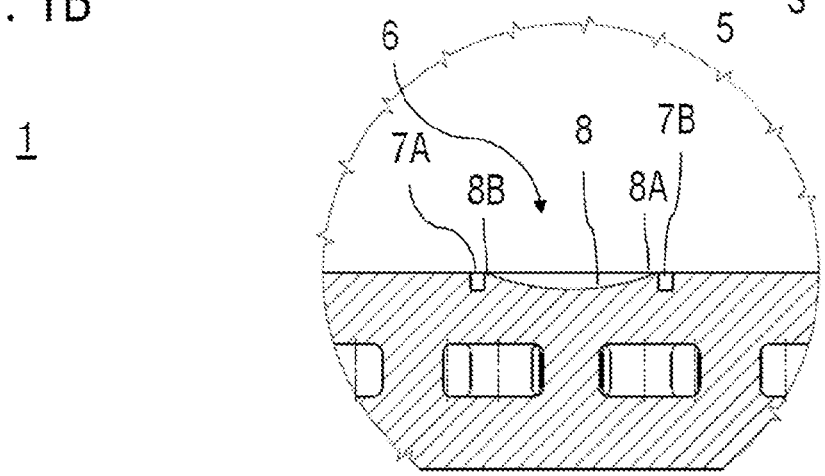
Figure 1C:
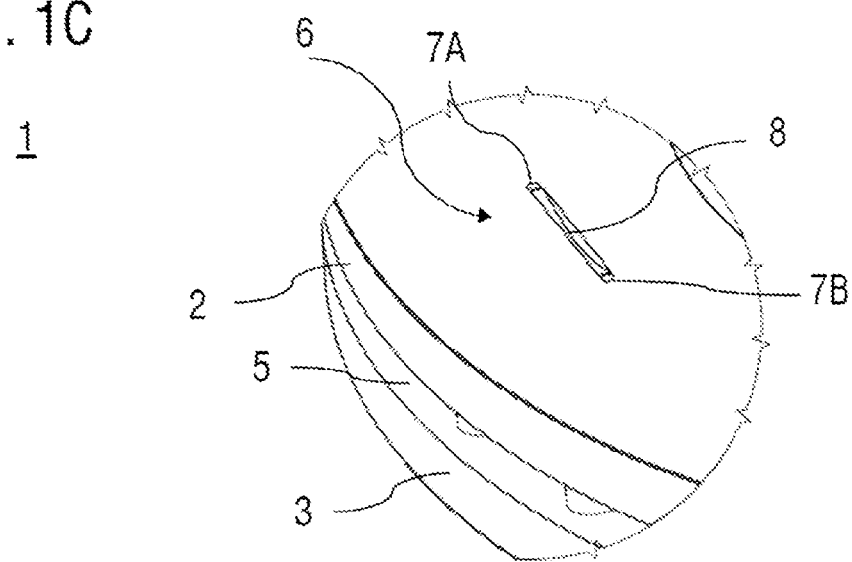

FIGS. 1A to 1C show the state of the brake disc in the new state, i.e., without wear. In this state, two elongated hole-shaped depressions 7A and 7B are arranged adjacent to both end regions 8A, 8B of funnel-shaped depression 8. If the slot visible in a top view of funnel-shaped depression 8 thus extends up to both elongated hole-shaped depressions 7A and 7B, the user can recognise that brake disc 1 is still in the new state.

Figure 2A:
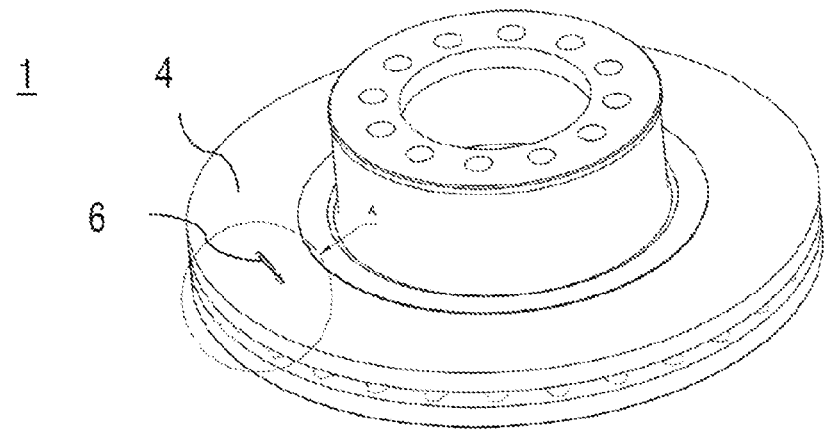
FIGS. 2A to 2C are a perspective view, a partial cross sectional view, and a magnified view of a brake disc according to the first exemplary embodiment in a second state of wear.
Figure 2B:
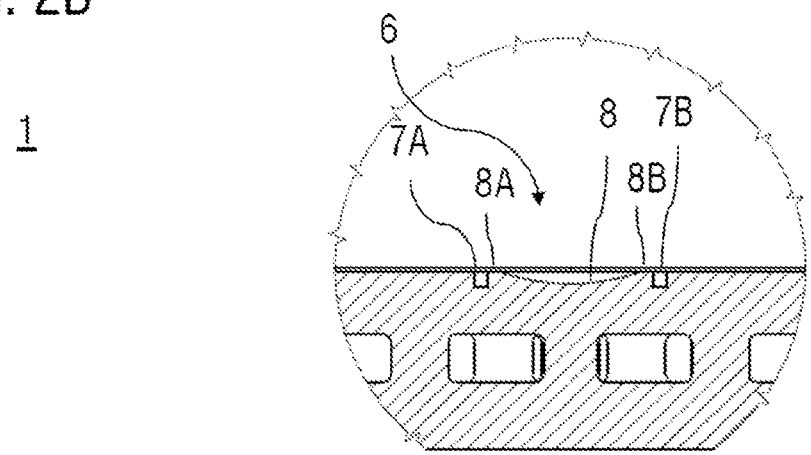
Figure 2C:
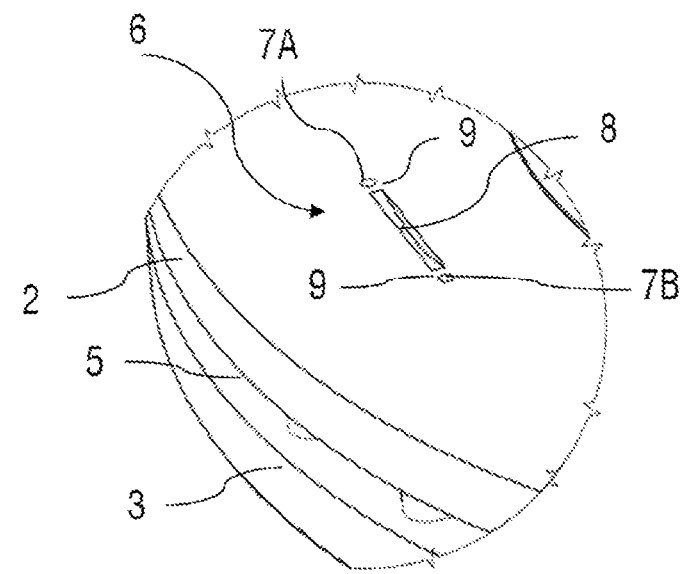

FIGS. 2A to 2C illustrate a first state of wear in which friction surface 4 has already been partially worn by abrasion. As a result, it is apparent in the top view of brake disc 1 that the funnel-shaped depression no longer extends up to elongated hole-shaped depressions 7A and 7B. A region 9 of the braking surface without a depression is exposed between the end region of elongated hole-shaped depression 8 and reference indicators 7A and 7B. From the size of region 9 or from the distance from end regions 8A, 8B of wear indicator 8 from reference indicators 7A and 7B, the user can identify the extent to which the wear of the brake disc has already progressed.

Figure 3A:
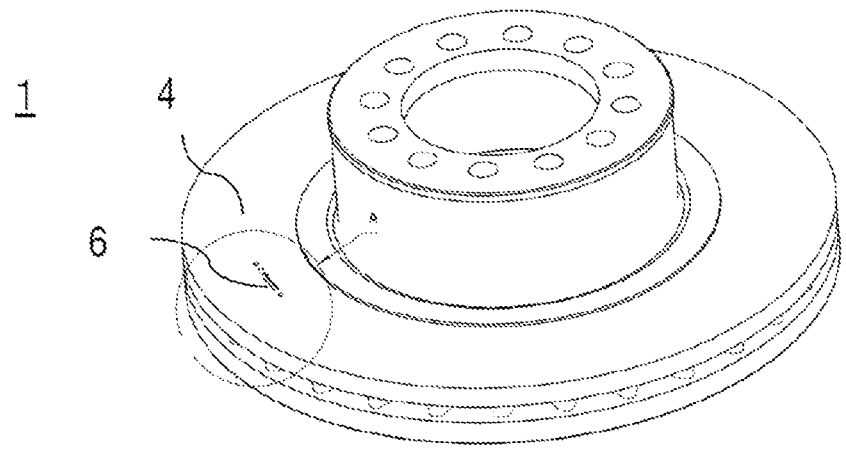
FIGS. 3A to 3C are a perspective view, a partial cross sectional view, and a magnified view of a brake disc according to the first exemplary embodiment in a third state of wear.
Figure 3B:
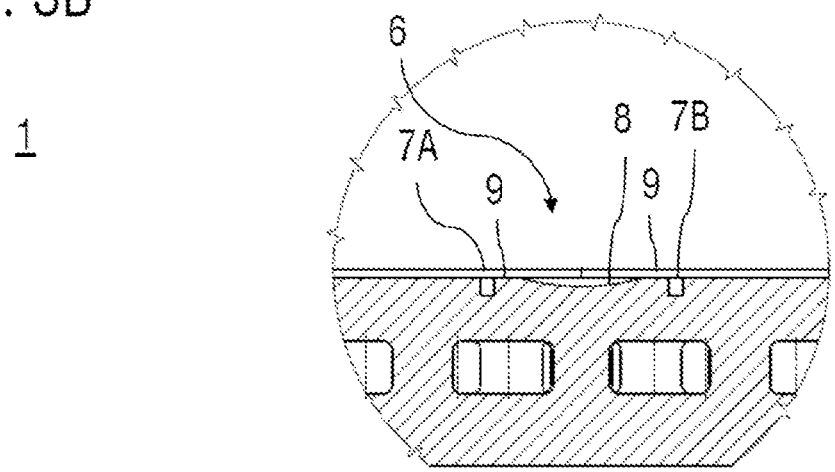
Figure 3C:
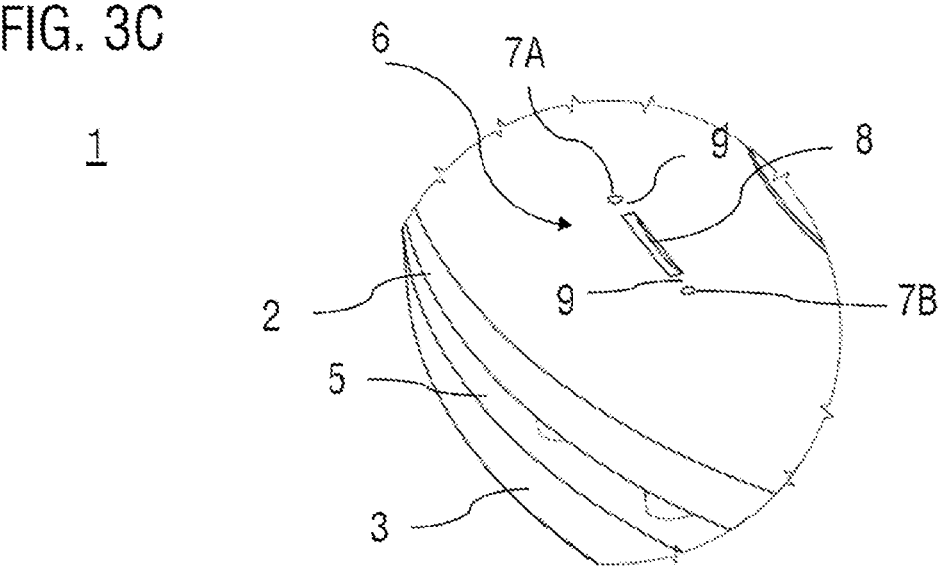

FIGS. 3A to 3C show a state with a higher degree of wear in comparison to FIGS. 2A to 2C. This is apparent from the fact that region 9 has become larger in comparison to FIGS. 2A to 2C since a further surface layer of braking surface 4 has been removed as a result of wear. It is furthermore apparent in FIG. 3B that, as a result of the wear of braking surface 4, the funnel-shaped depression in the vertical and the horizontal expansion was made even smaller.

Figure 4A:
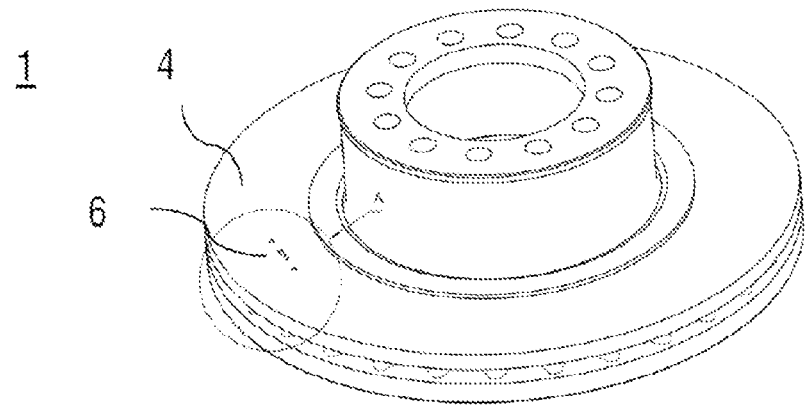
FIGS. 4A to 4C are a perspective view, a partial cross sectional view, and a magnified view of a brake disc according to the first exemplary embodiment in a fourth state of wear.
Figure 4B:
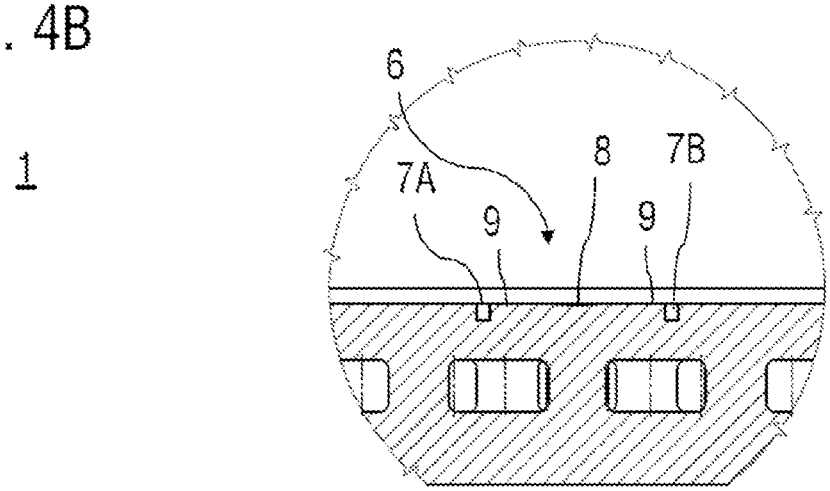
Figure 4C:
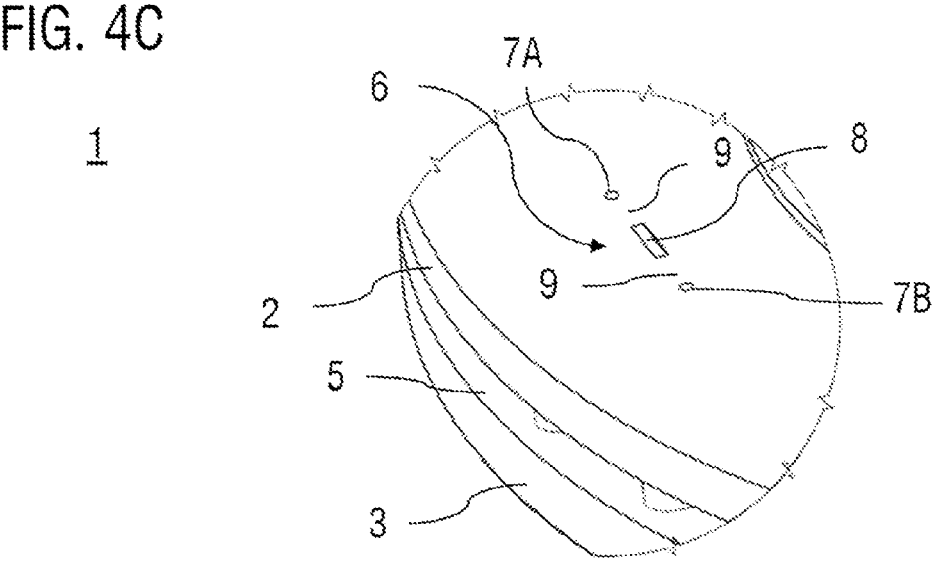

In a comparable manner, FIGS. 4A to 4C show a state with a higher level of wear in the case of which the distance from funnel-shaped depression 8 to reference indicators 7A and 7B became even larger.

Figure 5A:
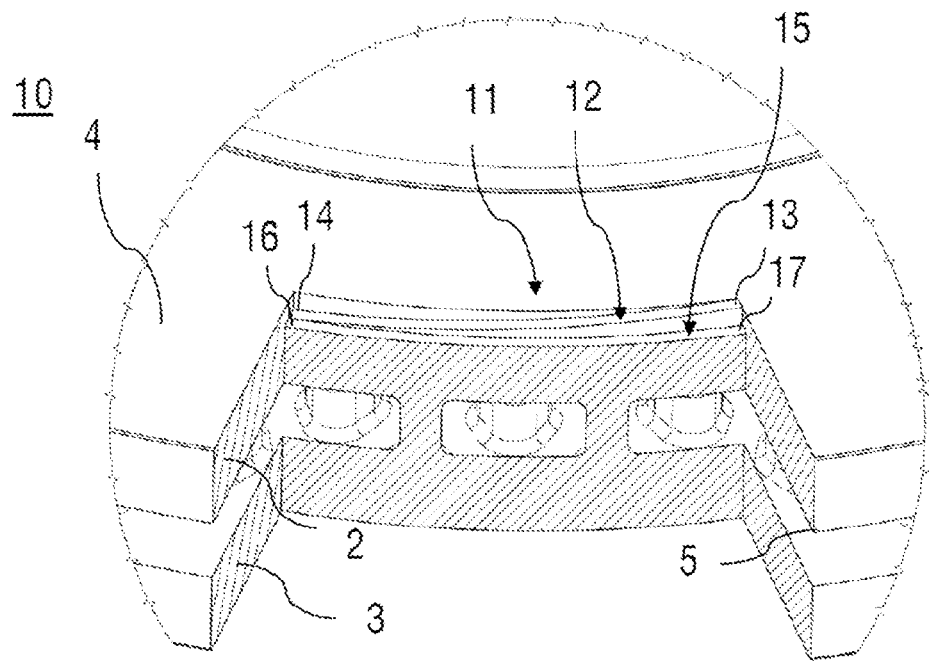
FIGS. 5A and 5B are a partial cross sectional view and a perspective view of a brake disc according to a second exemplary embodiment in a first state of wear.

FIG. 5A shows a further exemplary embodiment of a brake disc 10 in an enlarged partial sectional view. Visually apparent wear display 11 is, in this exemplary embodiment, formed from a wear indicator which is embodied as a ramp-shaped recess 12 of braking surface 4 and from a groove-shaped recess which is arranged offset parallel to ramp-shaped recess 12. Groove-shaped recess 15 has a constant depth which corresponds to the maximum depth of ramp-shaped recess 12. Ramp-shaped recess 12 and groove-shaped recess 15 are, in the new state of the brake disc which is shown in FIG. 5A, of equal length so that starting point 13 of the ramp-shaped recess lies directly adjacent to starting point 17 of the groove-shaped recess. The same applies to both end points 14, 16 of both recesses.

Figure 5B:
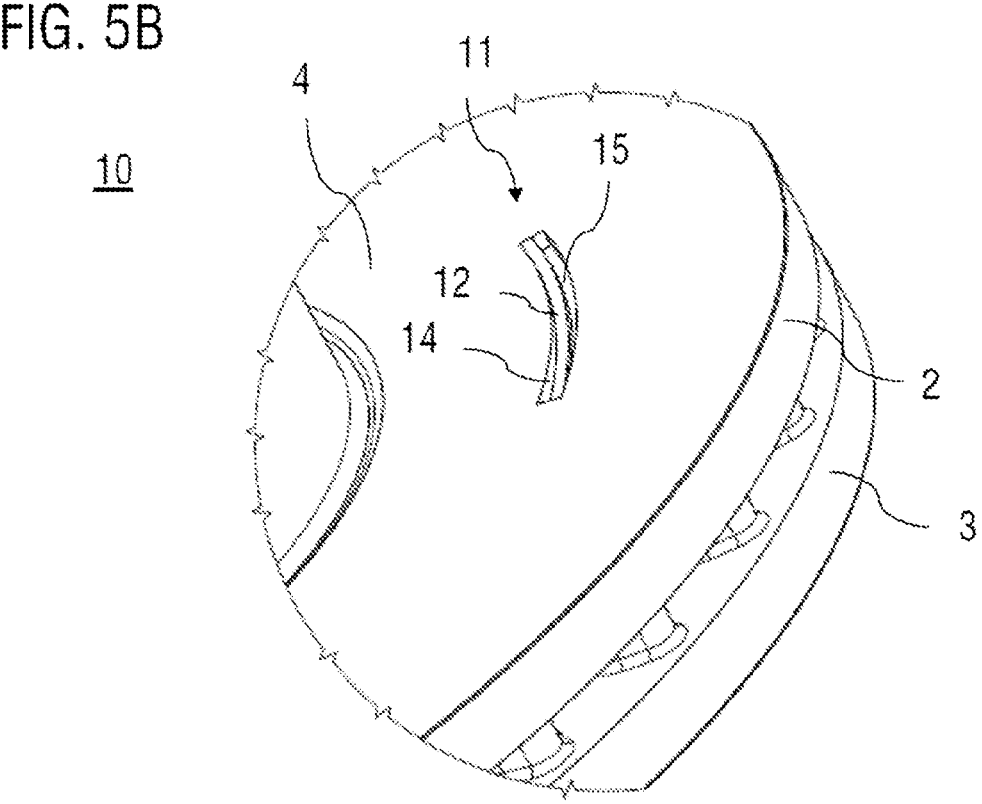

FIG. 5B shows the new state in a perspective top view, where it is apparent that the appearance of wear indicator 12 and of reference indicator 15 is identical, from which the user can conclude that the brake disc is in a new state or in an unworn state.

Figure 6A:
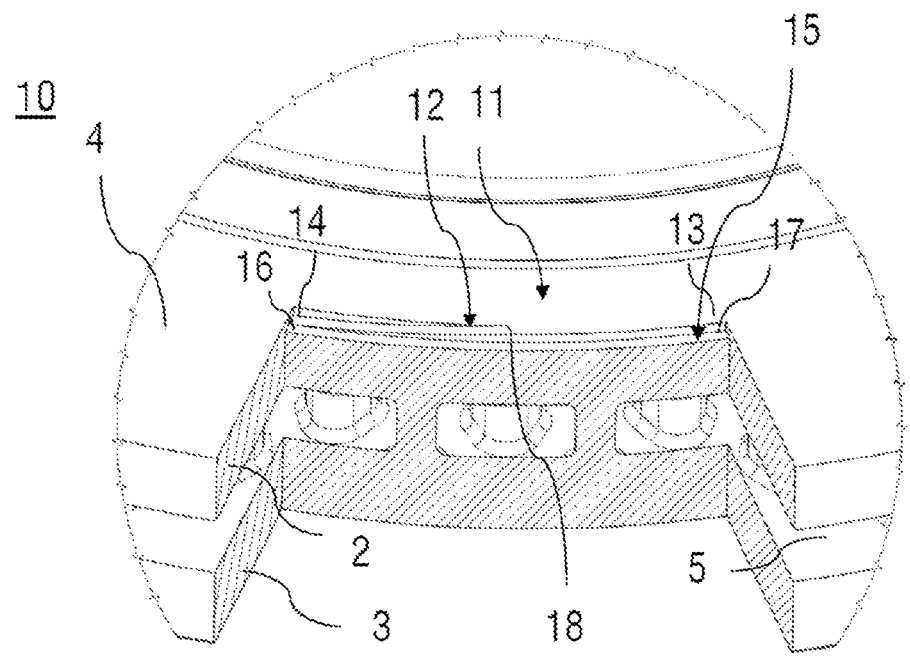
FIGS. 6A and 6B are a partial cross sectional view and a perspective view of a brake disc according to the second exemplary embodiment in a second state of wear.
Figure 6B:
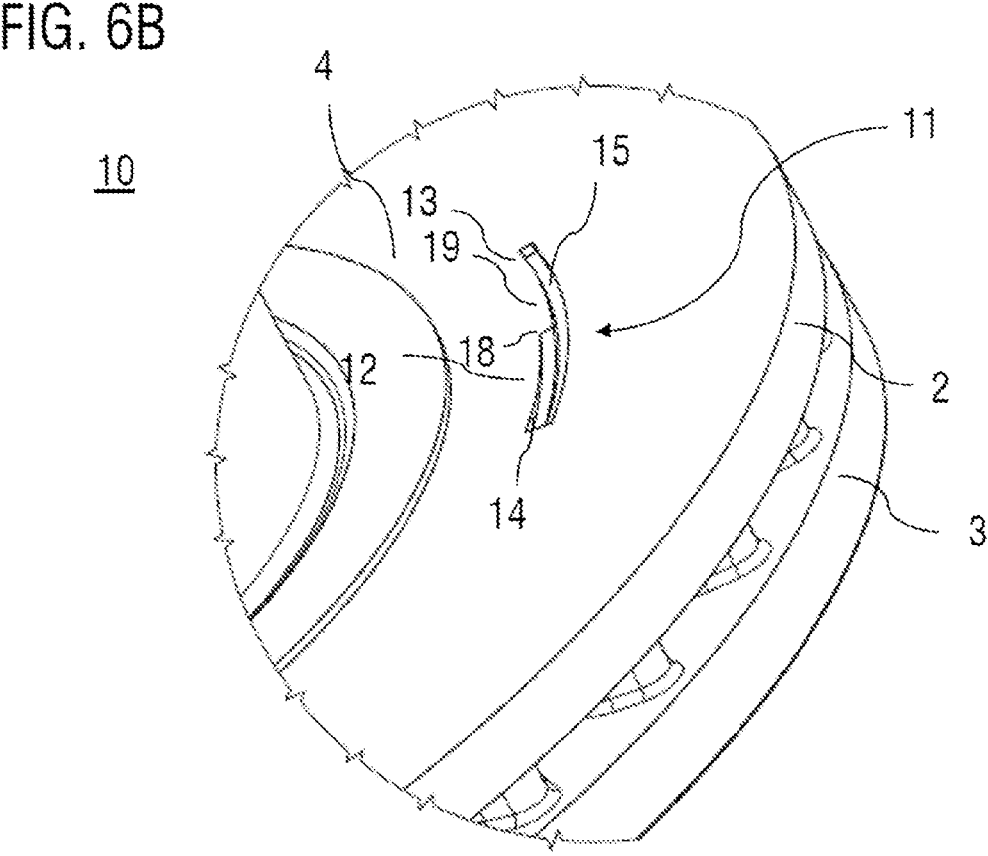

FIGS. 6A and 6B shows a state of medium wear. In this state, braking surface 4 is already so worn that already half of ramp-shaped depression 12 has been removed. As a result, it is apparent in a top view of braking surface 4 that edge region 18 of wear indicator 12 has migrated to the centre of reference indicator 15 so that the exposed surface of braking surface without a depression 19 is exposed between original edge region 13 and current edge region 18. The state of reference indicator 15 is unchanged.

It is further apparent that the combination of wear indicator 12 and reference indicator 15 enables determining in each case the current state of wear in a simple manner visually without further aids since a comparison of the length along braking surface 4 of remaining wear indicator 12 with the unchanged length of groove-shaped depression 15 shows the progression of wear.

In the case of the state of wear represented in FIG. 6B, it can be concluded, for example, from the relative length of remaining wear indicator 12 relative to the length of groove-shaped depression 15 that approximately half of the brake disc is worn. To this end, it is naturally necessary that the brake disc and the depths of the groove- or ramp-shaped recesses are formed so that the relative lengths of the recesses correlate to the respective state of wear with the relative state of wear.

Figure 7A:
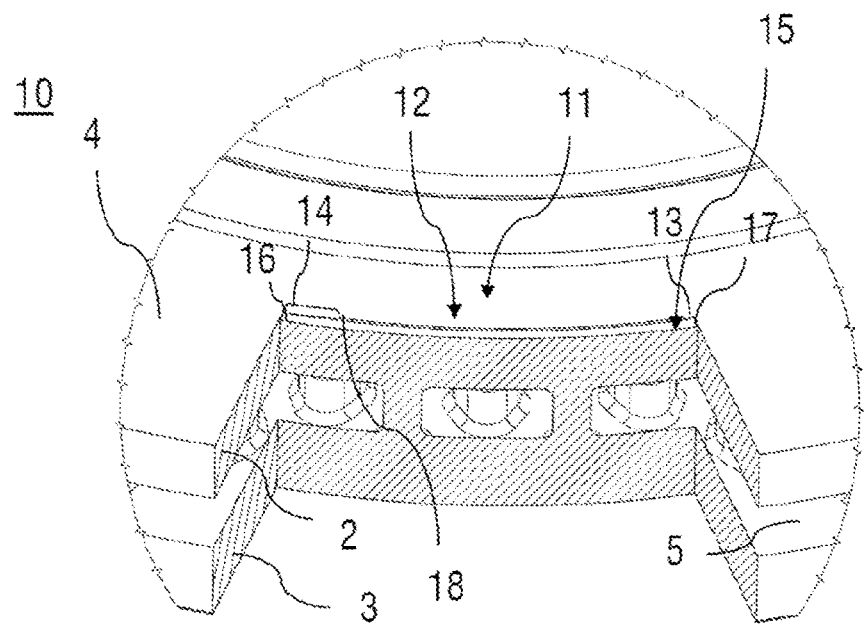
FIGS. 7A and 7B are a partial cross sectional view and a perspective view of a brake disc according to the second exemplary embodiment in a third state of wear.
Figure 7B:
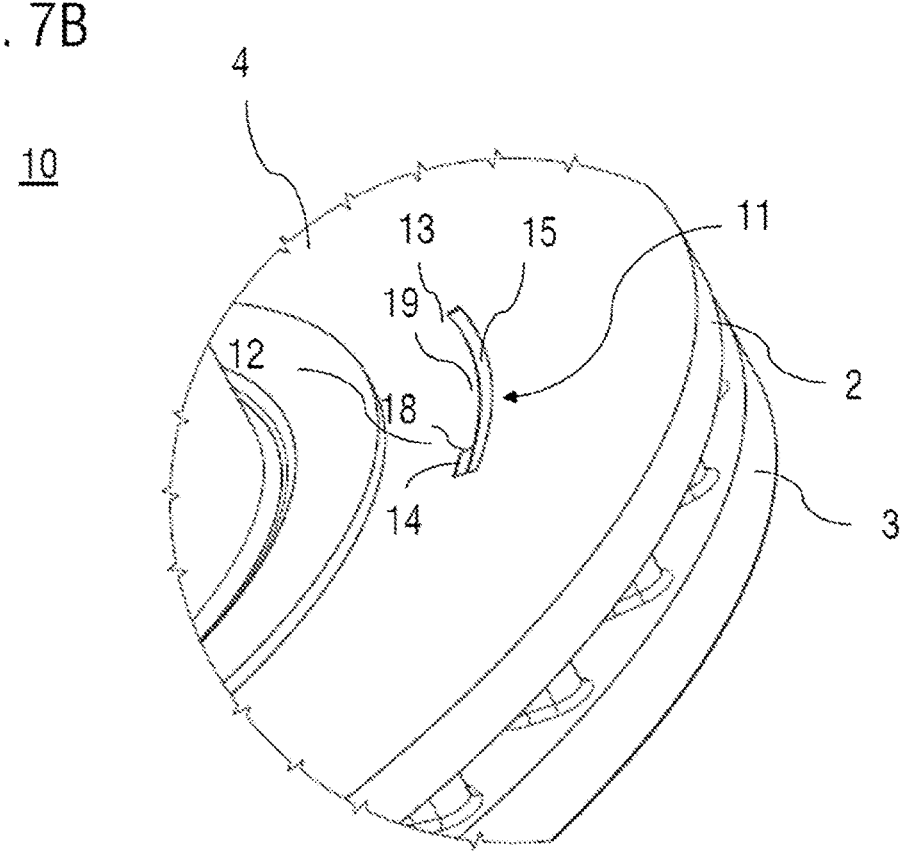

FIGS. 7A and 7B represent a third state of wear which shows a state of even greater wear. In particular a state of wear is shown which makes a replacement of the brake disc necessary since the remaining length of the wear feature is small relative to the length of the reference feature. The end region of wear feature 18 has migrated almost to opposite end region 14.

Figure 8:
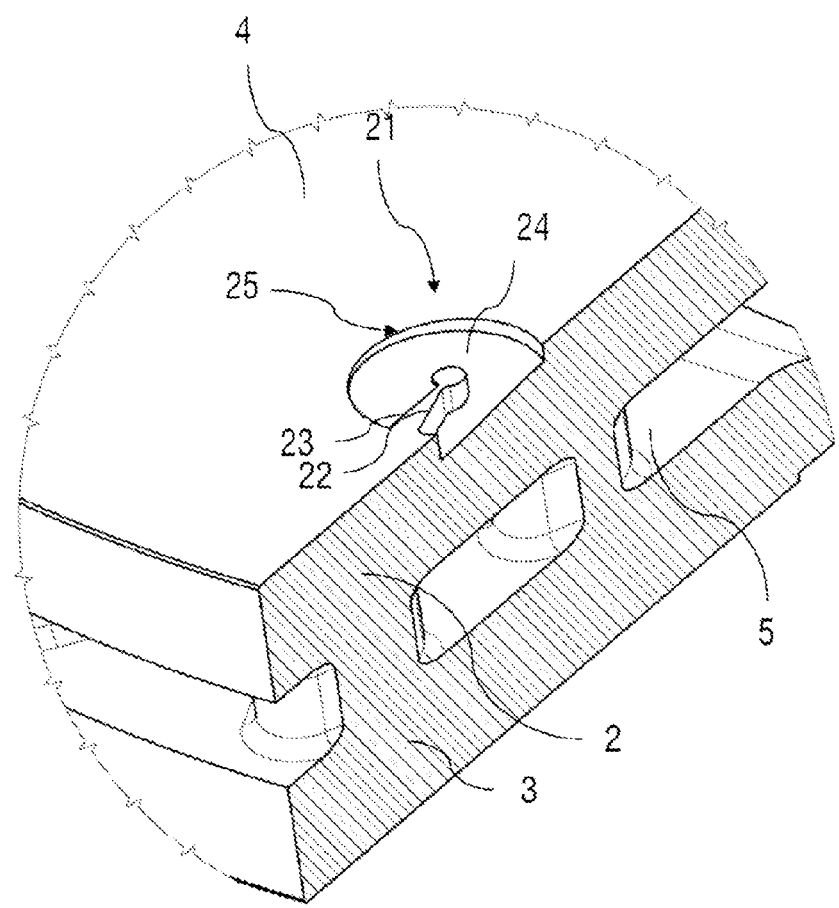
FIG. 8 is a partial sectional view of a brake disc according to a third exemplary embodiment in a first state of wear.

FIG. 8 shows a further embodiment variant of a brake disc 20 in an enlarged representation of the region of the braking surface on which the wear indicator and the reference indicator are accommodated. According to this variant, the wear indicator is embodied as a helical recess 21. Helical recess 21 is delimited at one end by an edge 22 which is arranged in a stationary manner on braking surface 4 and remains visible across all states of wear.

However, a further edge 23 changes with an increasing state of wear and migrates in a clockwise direction with reducing arc length 25. Proceeding from edge 23, a surface 24 extends in a spiral shape in the direction of wear on an incline up to stationary edge 22.

Figure 9:
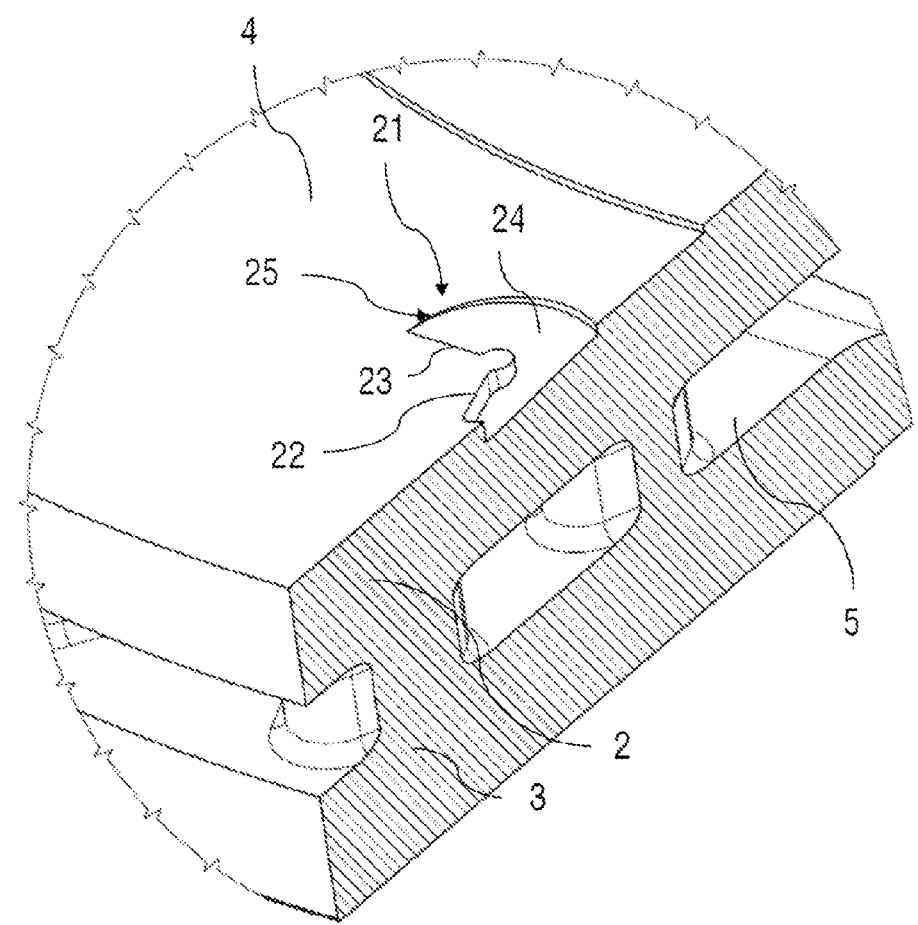
FIG. 9 is a partial sectional view of a brake disc according to the third exemplary embodiment in a second state of wear.
Figure 10:
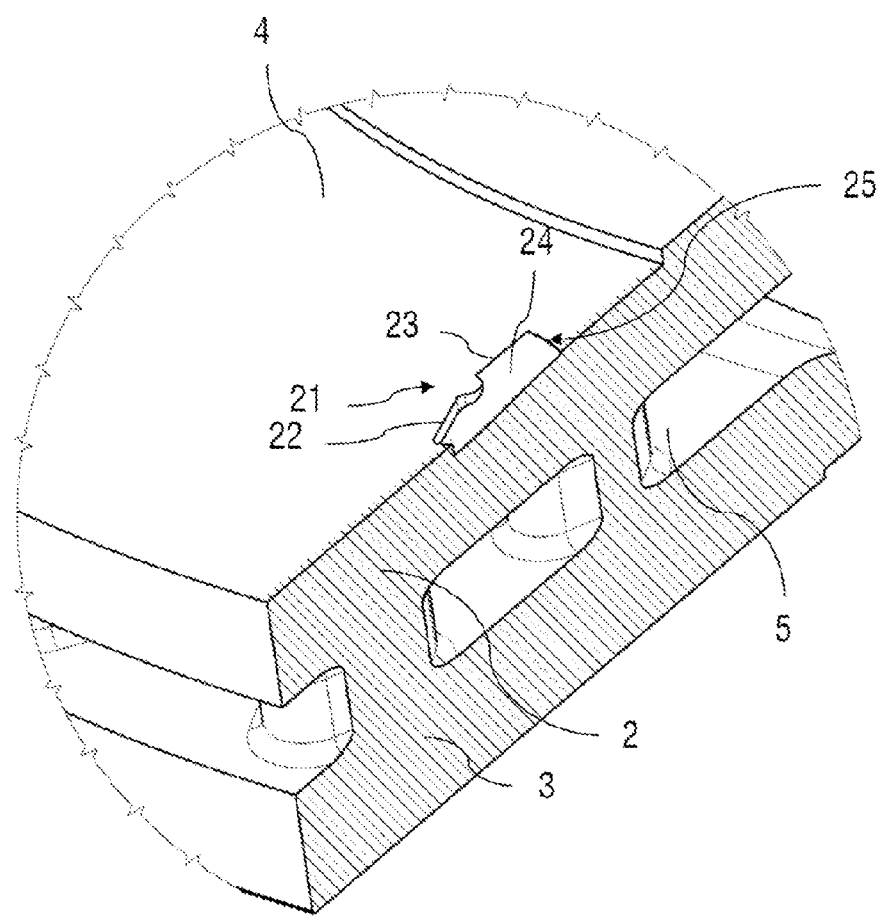
FIG. 10 is a partial sectional view of a brake disc according to the third exemplary embodiment in a third state of wear.

This is represented in FIGS. 9 and 10 which show states with respectively increasing wear. The helical recess forms a self-reference since the progression of the state of wear can be read off from visible arc length 25 or on the basis of the relative position of migrating edge 13 to fixed edge 22. The state of wear can also be derived from the central angle between edge 23 and edge 22 since the central angle in the new state is almost 360° and becomes smaller with increasing wear. The helical recess can be incorporated, for example, by fixing the inclination of the helix so that edge 23 in the new state of the brake disc is arranged in the position of FIG. 8, in the case of 25% wear at the position of FIG. 9, in the case 50% wear at the position of FIG. 10, etc.

Figure 11:
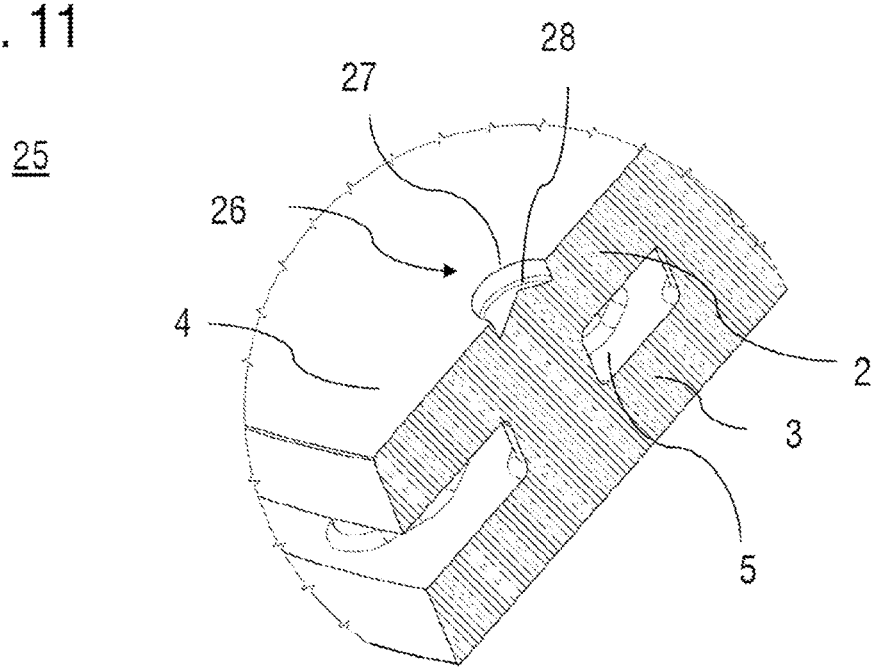
FIG. 11 is a partial sectional view of a brake disc according to a fourth exemplary embodiment in a first state of wear.

FIG. 11 shows a further exemplary embodiment of a brake disc 25 in an enlarged representation of the region of the braking surface on which the wear indicator and the reference indicator are fitted. According to this exemplary embodiment, the wear indicator is embodied as a countersunk elevation 26 which is inserted into braking surface 4. Countersunk elevation 26 tapers conically towards braking surface 4. In the new state of the brake disc, countersunk elevation 26 forms an upper tip in region 28. Countersunk elevation 26 is surrounded concentrically by an edge 27 of braking surface 24 which simultaneously serves as a reference indicator which is described below.

Figure 12:
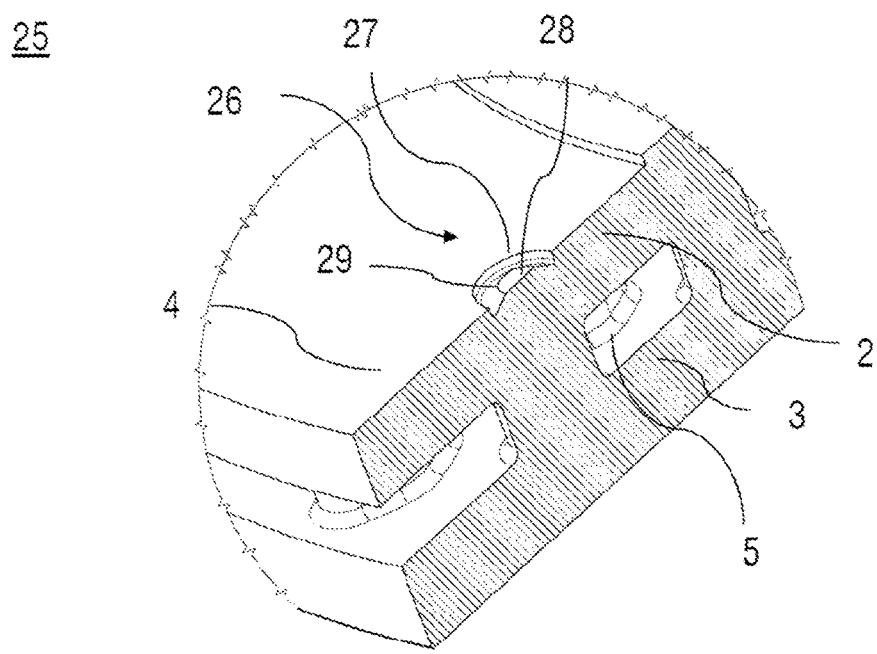
FIG. 12 is a partial sectional view of a brake disc according to the fourth exemplary embodiment in a second state of wear.

FIG. 12 shows a first state of wear in the case of which a part of braking surface 4 has been removed as a result of wear. As a result, an upper part of elevation 26 was also removed so that the elevation is now in the shape of a truncated cone. The upper tip was removed and appears as a circular surface 28 in a top view.

Figure 13:
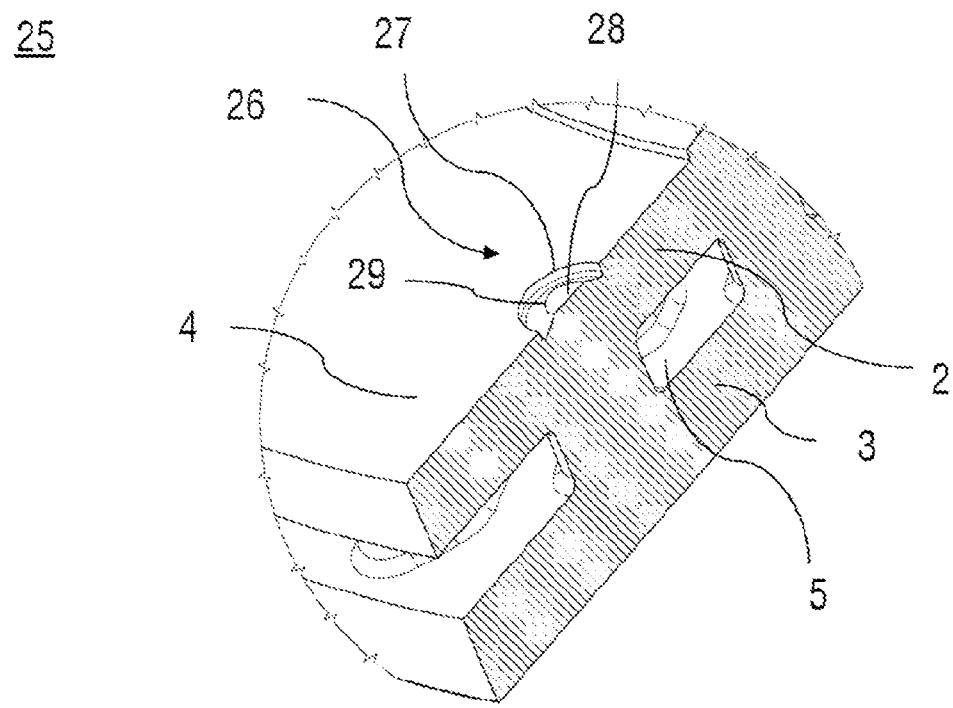
FIG. 13 is a partial sectional view of a brake disc according to the fourth exemplary embodiment in a third state of wear.
Figure 14:
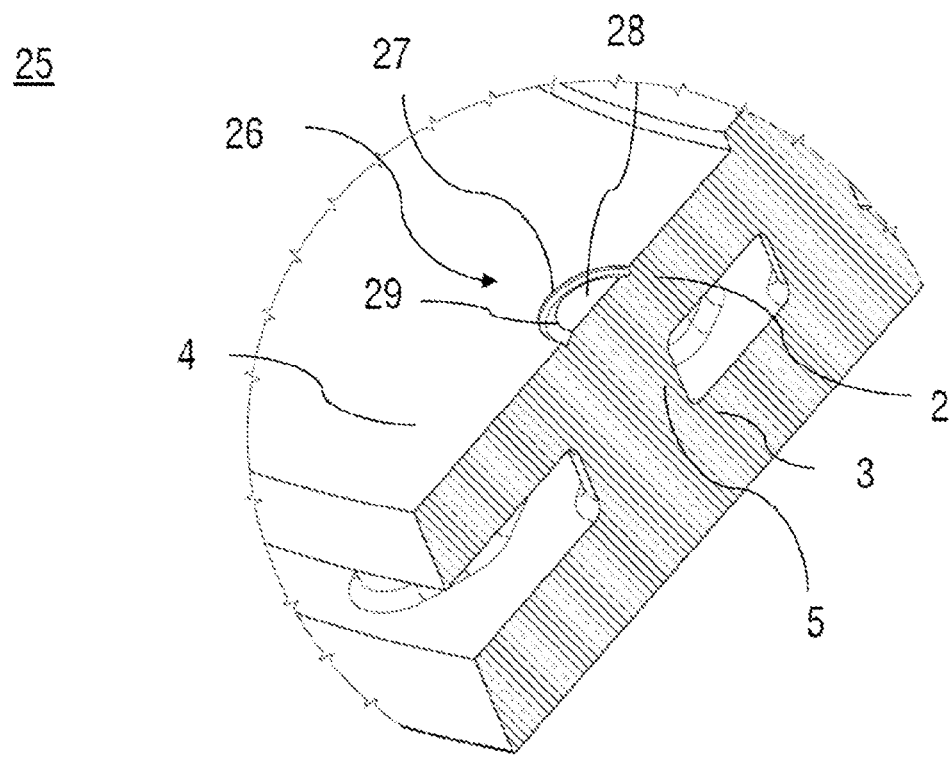
FIG. 14 is a partial sectional view of a brake disc according to the fourth exemplary embodiment in a fourth state of wear.

FIGS. 13 and 14 represent in each case further states of wear, the state of wear in FIG. 14 being the most advanced. It is apparent from this that with increasing wear the level of the truncated cone of elevation 26 is reduced and as a result upper circular surface 28 increases in size. As a result, the distance from circumferential edge 29 of the circular surface to reference edge 27 is reduced. Both edges 29 and 27 thus approximate one another with increasing wear.

The progression of wear can be derived from the comparison of the two radii of edges 29 and 27 or from the distance from circular edge 29 to concentrically arranged circular edge 27. The smaller the distance from edge 29 to reference edge 27 or the smaller the ratio of the radius of circular edge 29 to the radius of circular edge 27, the more advanced the state of wear. This embodiment thus also enables a visually simple detection of the new state of the brake disc, of the maximum state of wear and of the progression of the wear on the basis of interim states.

The embodiment variants described by way of example show that the user can detect the state of wear by comparison of the wear indicator with the reference indicator. The user can in particular not only precisely determine the starting and end state of wear, rather also detect the percentage progression of wear easily and without further aids. In particular, a look through the hand holes of the rim is sufficient in order to determine the state of wear so that no disassembly of the tyre is necessary.

The variants described above for forming a visually apparent wear display can be produced in a variety of ways.

The wear indicators and reference indicators can already be accommodated in the casting process. When cutting the molding blank, the indicators are then taken as reference points with regard to which the subsequent machining is aligned. It is particular advantageous here if the wear indicators and reference indicators then also reflect the direct relationship of the distance to the cooling channel friction surface which is relevant in terms of strength and defines the critical gauge more precisely. Alternatively, the wear features can be incorporated by machining, e.g., by boring or milling.

Figure 15A:
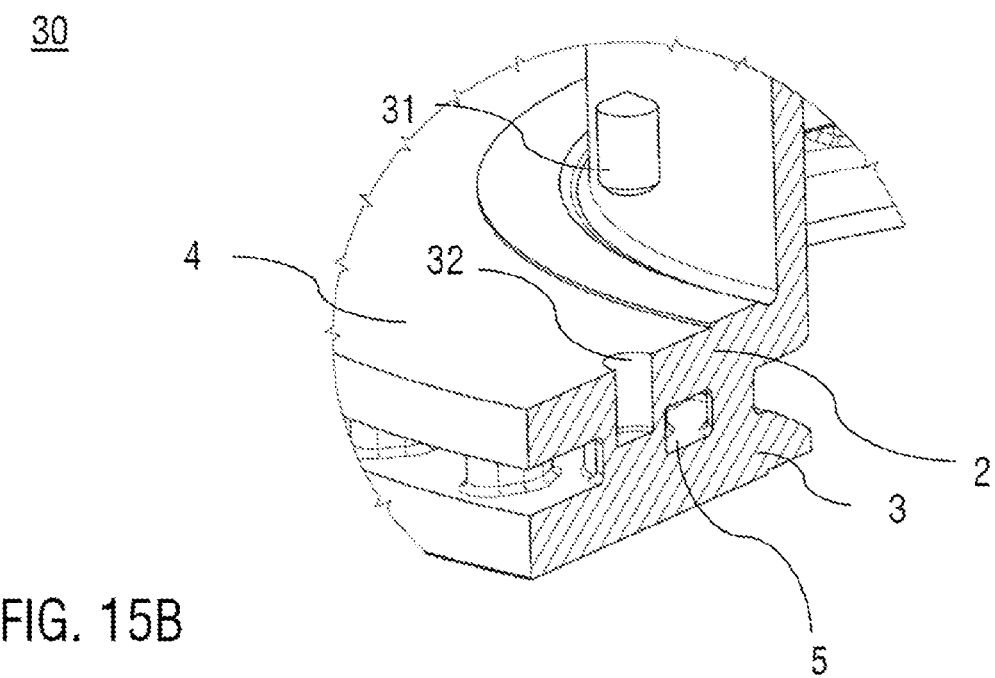
FIGS. 15A and 15B are partial sectional views schematically showing the insertion of a wear indicator into the brake disc.
Figure 15B:
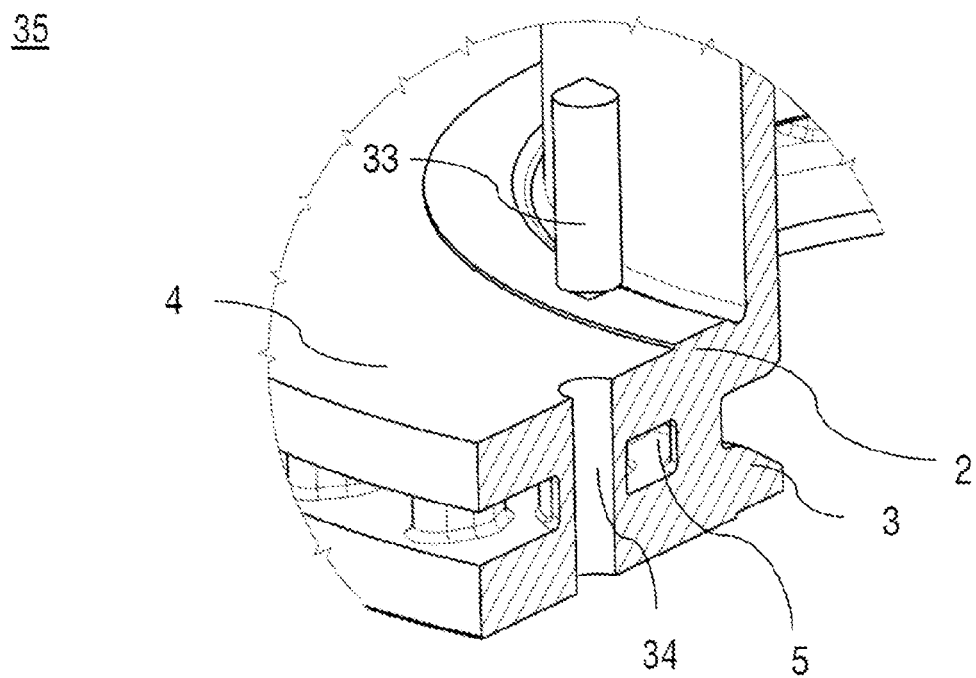

In a further embodiment of the invention, defined recesses such as pockets 32 or 34 can be provided in brake discs 30, 35, which is represented in FIG. 15A or 15B. The wear features can be subsequently fixed, for example, pressed-in, welded-on or screwed-in, into pockets 32 or 34. The wear features themselves can then be produced in a separate process. Alternatively, shaping measures can also be used to incorporate the feature.

Although the invention has been described with reference to specific exemplary embodiments, a plurality of variants and modifications are possible which also make use of the concept of the invention and thus fall into the scope of protection. As a result, the invention should not be restricted to the disclosed specific exemplary embodiments, rather the invention should encompass all the exemplary embodiments which fall into the scope of the attached claims.

LIST OF REFERENCE NUMBERS 1, 10, 20, 25, 35 Brake disc
2, 3 Brake disc
4 Braking surface
5 Gap for cooling
6, 11 Visually apparent wear display
7A, 7B Elongated hole-shaped depression
8 Funnel-shaped depression
9 Region between elongated hole-shaped depression and funnel-shaped depression
12 Ramp-shaped depression
13 Starting region
14 End region
15 Groove-shaped depression
16 Starting region
17 End region
18 Migrating end region
19 Exposed surface of the braking surface
21 Helical recess
22 Reference edge
23 Migrating edge
24 Spiral-shaped surface
26 Countersunk elevation
27 Reference edge
28 Visible elevation
29 Circumferential edge of the visible elevation
31, 33 Wear indicator or reference indicator
32, 34 Introduction pocket

The invention claimed is:

1. A brake disc for a vehicle, comprising:
a braking surface;
a wear indicator disposed in the braking surface and embodied such that an appearance of the wear indicator in a top view of the braking surface exhibits a change across a reducing level of wear; and
a reference indicator disposed in the braking surface and embodied such that an appearance of the reference indicator in a top view of the braking surface does not change across the reducing level of wear or changes differently in a specified manner relative to the change in the wear indicator so that wear progression is indicated by the appearance of the wear indicator in relation to the appearance of the reference indicator,
wherein the braking surface has a recess with a length that changes across the reducing level of wear and a width that remains the same across the reducing level of wear, the length being longer than the width in a new state of the brake disc, the wear indicator corresponding to the length of the recess, and the reference indicator comprises two depressions at opposing ends of the recess in the length direction.

2. The brake disc according to claim 1, wherein the wear indicator and the reference indicator are embodied such that the depressions of the reference indicator indicate an original length of the recess in the new state and the distance between each of the opposing ends of the recess and an associated one of the respective depressions increases across the reducing level of wear.

3. The brake disc according to claim 1, wherein a depth of the depressions is at least as large as a maximum depth of the recess.

4. The brake disc according to claim 1, wherein the recess is a funnel-shaped recess that tapers in a funnel shape in the direction of wear.

5. The brake disc according to claim 1, wherein a plurality of wear indicators with one or more assigned reference indicators are evenly distributed on the braking surface.

6. The brake disc according to claim 1, wherein the appearance of the reference indicator in a top view of the braking surface changes linearly across the reducing level of wear.

7. A vehicle, in particular commercial vehicle, with a brake disc according to claim 1.

* * * * *